(12) United States Patent
Ogasawara et al.

(10) Patent No.: US 9,372,551 B2
(45) Date of Patent: Jun. 21, 2016

(54) IMAGE READING APPARATUS

(75) Inventors: Yasuhiro Ogasawara, Kanagawa (JP); Shin Takeuchi, Tokyo (JP); Eisuke Osakabe, Kanagawa (JP); Eigo Nakagawa, Ebina (JP); Hirokazu Ichikawa, Kanagawa (JP); Kazushige Ooi, Ebina (JP); Hidenobu Takahira, Ebina (JP)

(73) Assignee: FUJI XEROX CO., LTD., Tokyo (JP)

( * ) Notice: Subject to any disclaimer, the term of this patent is extended or adjusted under 35 U.S.C. 154(b) by 885 days.

(21) Appl. No.: 12/558,942

(22) Filed: Sep. 14, 2009

(65) Prior Publication Data

US 2010/0155478 A1 Jun. 24, 2010

(30) Foreign Application Priority Data

Dec. 24, 2008 (JP) ................................. 2008-328245

(51) Int. Cl.
G06K 7/10 (2006.01)
G06F 3/0354 (2013.01)

(52) U.S. Cl.
CPC ................................. *G06F 3/03542* (2013.01)

(58) Field of Classification Search
USPC ........................................................ 235/454
See application file for complete search history.

(56) References Cited

U.S. PATENT DOCUMENTS

| 5,010,241 A | 4/1991 | Butterworth | ................... 235/472 |
| 5,214,270 A * | 5/1993 | Rando | ................ G06K 7/10871 |
| | | | 235/462.36 |
| 5,585,615 A | 12/1996 | Iwanami et al. | .............. 235/472 |
| 5,956,447 A * | 9/1999 | Zel'Dovich | .............. G02B 6/02 |
| | | | 235/462.01 |
| 5,966,476 A * | 10/1999 | Hwang | .................. G02F 1/2955 |
| | | | 385/1 |
| 6,394,349 B1 | 5/2002 | Shigekusa et al. | |
| 2001/0038038 A1* | 11/2001 | Rando | ................ G06K 7/10891 |
| | | | 235/462.45 |
| 2002/0125324 A1* | 9/2002 | Yavid | .................... H04N 9/3129 |
| | | | 235/462.45 |
| 2004/0222301 A1 | 11/2004 | Willins et al. | |
| 2007/0001014 A1* | 1/2007 | Bremer | .............. G06K 7/10554 |
| | | | 235/462.33 |
| 2007/0012781 A1* | 1/2007 | Heinrich | ............ G06K 7/10584 |
| | | | 235/473 |
| 2007/0278312 A1* | 12/2007 | Kato | .................... G02B 6/3514 |
| | | | 235/462.38 |
| 2008/0066973 A1 | 3/2008 | Furuki | |

FOREIGN PATENT DOCUMENTS

| CN | 1784687 A | 6/2006 |
| JP | 58-97670 U | 7/1983 |
| JP | 60-187972 U | 12/1985 |

(Continued)

OTHER PUBLICATIONS

Chinese Office Action in Chinese Patent Application No. 200910179768.9 issued on Apr. 28, 2013.

(Continued)

*Primary Examiner* — Michael G Lee
*Assistant Examiner* — David Tardif
(74) *Attorney, Agent, or Firm* — Sughrue Mion, PLLC

(57) ABSTRACT

An image reading apparatus includes: a light source that irradiates light; a switching unit that switches a direction of the light irradiated by the light source to one of a plurality of predetermined directions; a light guiding unit that guides the light whose direction is switched by the switching unit and that travels in one of the plurality of directions to a position predetermined for each of the directions; and a light sensor that, in a case where an object is in the predetermined position, measures light reflect by the object out of the light guided to the position by the light guiding unit.

19 Claims, 4 Drawing Sheets

(56) References Cited

FOREIGN PATENT DOCUMENTS

| JP | 62-288816 A | 12/1987 |
| JP | 06-2464 U | 1/1994 |
| JP | 10-040328 A | 2/1998 |
| JP | 11-120284 A | 4/1999 |
| JP | 2008-77168 A | 4/2008 |
| JP | 2008-204328 A | 9/2008 |

OTHER PUBLICATIONS

Japanese Office Action issued in corresponding Japanese Application No. 2008-328245, dated Aug. 7, 2012.

* cited by examiner

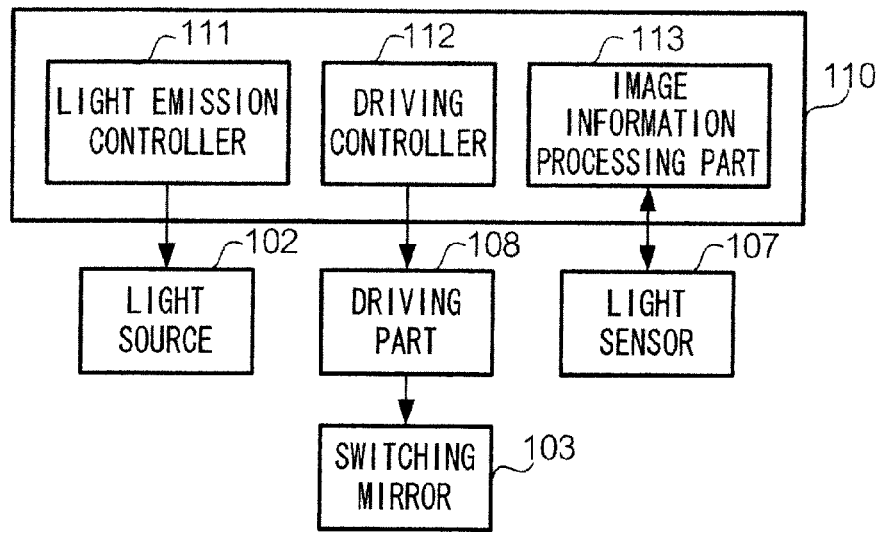
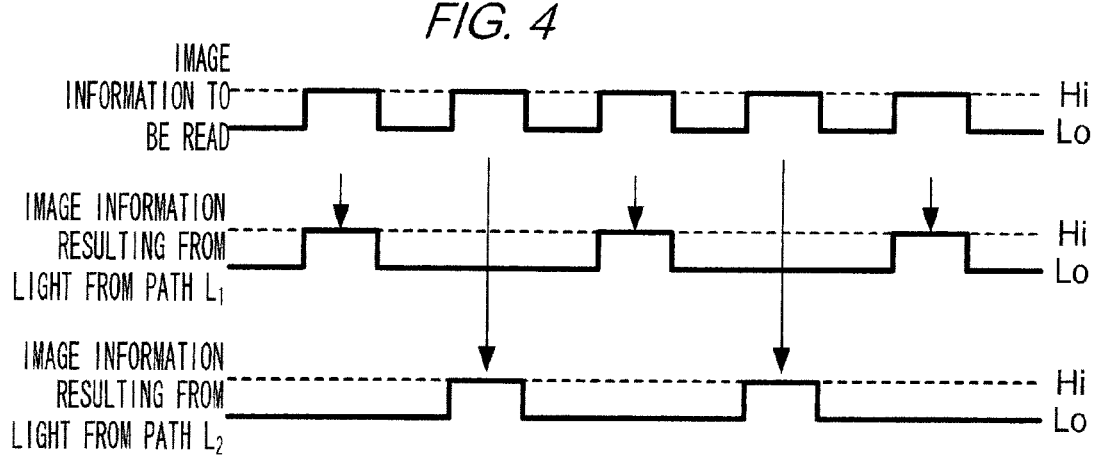
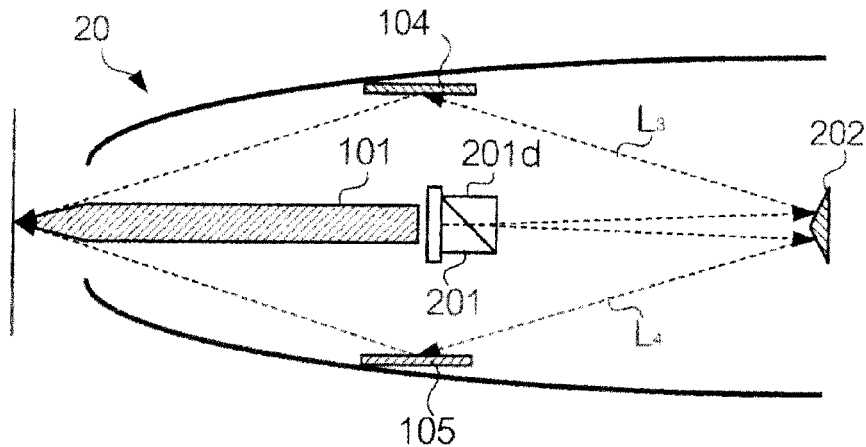

US 9,372,551 B2

IMAGE READING APPARATUS

CROSS-REFERENCE TO RELATED APPLICATIONS

This application claims priority under 35 USC 119 from a Japanese patent application No. 2008-328245 filed on Dec. 24, 2008.

BACKGROUND

1. Technical Field

The present invention relates to an image reading apparatus.

2. Related Art

Provision of multiple light sources is known as a technique for suppressing reading errors in an image reading apparatus.

SUMMARY

According to one aspect of the invention, there is provided an image reading apparatus including: a light source that irradiates light, a switching part that switches a direction of travel of the light irradiated by the light source to one of multiple predetermined directions, a light guiding part that guides the light whose direction of travel is switched by the switching part and that travels in one of the multiple directions to a position predetermined for each of the directions, and a light sensor that, in a case where an object is in the predetermined position, measures light reflect by the object out of the light guided to the position by the light guiding part.

BRIEF DESCRIPTION OF THE DRAWINGS

Exemplary embodiments of the present invention will be described in detail based on the following figures, wherein:

FIG. 3 is a block diagram showing a configuration of a control system of the image reading apparatus;

FIG. 4 is a timing chart showing a mode of reading image information;

FIG. 5 is a cross-sectional view showing a structure of a front end portion of the image reading apparatus;

DETAILED DESCRIPTION

1. First Exemplary Embodiment

Figure 1:
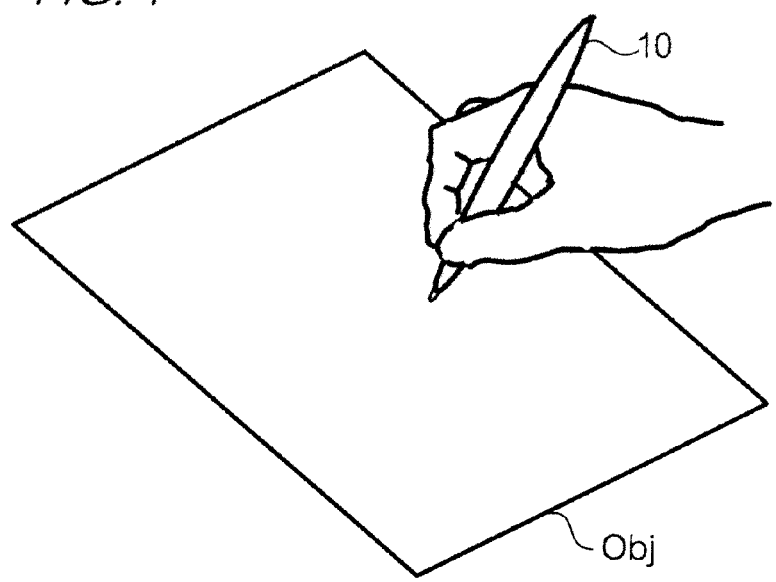
FIG. 1 illustrates a use mode of an image reading apparatus of the present invention.

FIG. 1 shows a use mode of an image reading apparatus according to a first exemplary embodiment of the present invention. The image reading apparatus 10 of the present exemplary embodiment has a pen-like appearance, and is used while being held by a user. The user points an object Obj, which is an object to be read, with the front end of the image reading apparatus 10, and moves the image reading apparatus 10 such that light is irradiated on the surface of the object. The image reading apparatus 10 may include a switch that switches the operation of the image reading apparatus on/off, or may also be supplied with power from an external device and operate continuously for the duration that the external device is operating.

The object Obj is, for example, a paper or a display device such as a liquid crystal display, and has an image formed on a surface thereof. The image formed on the object Obj, while not particularly limited, is assumed in the present exemplary embodiment to be an image representing positions (coordinates) on the object Obj. This image is obtained, for example, by a encoding the coordinates in accordance with a predetermined rule, and representing the code by a pattern formed with dots and lines. Hereinafter, this encoded image will be referred to a "code image".

Figure 2A:
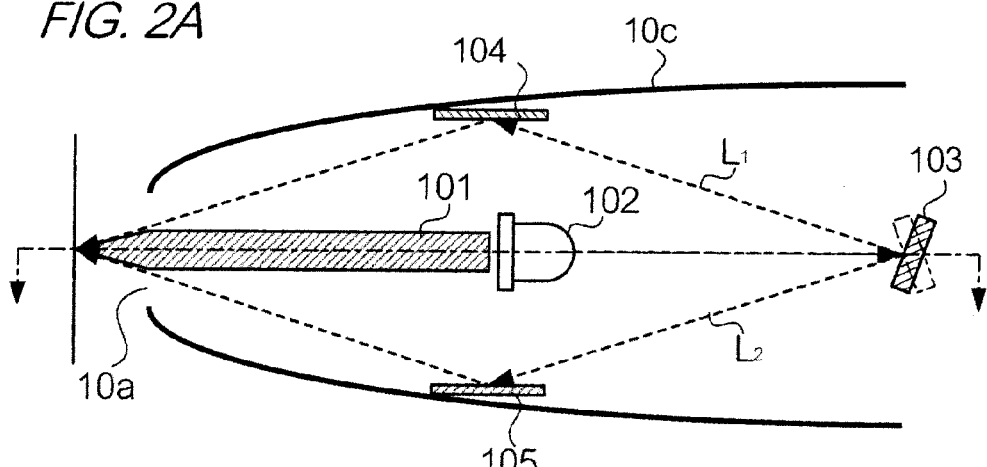
FIGS. 2A and 2B are cross-sectional views showing a structure of a front end portion of the image reading apparatus.
Figure 2B:
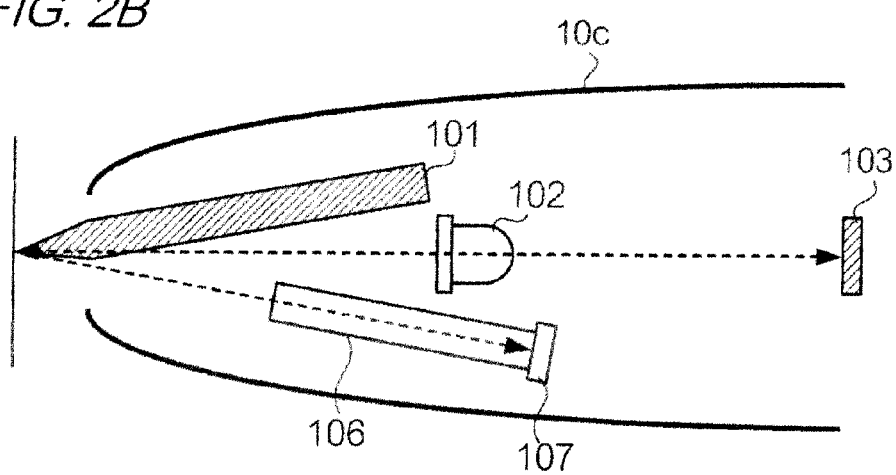

FIGS. 2A and 2B are cross-sectional views showing the structure of a front end portion of the image reading apparatus 10. FIG. 2B is a cross-sectional view in the case where the one-dot chain line in the cross-sectional view of FIG. 2A is the section line. The image reading apparatus 10 has an opening 10a in the front end of a casing 10c that is held by the user. A portion of an pointing member 101 is exposed through the opening 10a. The pointing member 101 is for pointing a position to be targeted as the position that the image reading apparatus 10 will read, and the front end thereof (the exposed side) desirably tapers. The image reading apparatus may be configured such that ink or the like comes out from the front end of the pointing member 101. Note that the position that the image reading apparatus 10 reads and the position targeted as the position to be read need not coincide, provided the interval therebetween is predetermined.

The image reading apparatus 10 includes a light source 102, a switching mirror 103, reflecting mirrors 104 and 105, a lens 106 and a light sensor 107 inside the casing 10c. The light source 102 is, for example, an LED (Light Emitting Diode) or an organic EL (Electro-Luminescence) light emitting element, and irradiates light in a predetermined direction. The light source 102 of the present exemplary embodiment irradiates light backwards, with a definition where the direction pointed by the pointing member 101 is viewed as forwards. The switching mirror 103 is provided in the direction in which the light source 102 irradiates light. The switching mirror 103 is a mirror that switches the direction of travel of light irradiated by the light source 102 to one of multiple predetermined directions (two directions in the present exemplary embodiment), and moves from the position shown with the solid line in FIG. 2A (hereinafter, "first position") to the position shown with the two-dot chain line (hereinafter, "second position"). The light irradiated from the light source 102 travels over a path $L_1$ when the switching mirror 103 is in the first position, and travels over a path $L_2$ when the switching mirror 103 is in the second position. The switching mirror 103 is an exemplary reflecting part of the present invention.

Note that the light traveling along the path $L_1$ or $L_2$ actually has a spread, and also exists in proximity to the path $L_1$ or the path $L_2$ in FIG. 2A. The path $L_1$ and the path $L_2$ in FIG. 2A are merely straight lines representatively showing the light that has a spread.

The reflecting mirrors 104 and 105 are exemplary light guiding parts of the present invention. The reflecting mirror 104 reflects and guides the light traveling over the path $L_1$ to a predetermined position, and the reflecting mirror 105 reflects and guides the light traveling over the path $L_2$ to a predetermined position. Here, a "predetermined position" to which light is guided is an area having a flat spread. Also, the position to which the reflecting mirror 104 guides light and the position to which the reflecting mirror 105 guides light may or may not overlap.

The light sensor 107 measures the light reflected by the object Obj, out of the light that was irradiated by the light source 102 and has traveled along the path $L_1$ or $L_2$, and generates image information that depends on the brightness (intensity) of the reflected light that is measured. An imaging device such as a CCD (Charge Coupled Device) sensor or a CMOS (Complementary Metal Oxide Semiconductor) sensor, for example, is employed as the light sensor 107. The lens 106 focuses incident light on the light sensor 107.

FIG. 3 is a block diagram showing a configuration of a control system of the image reading apparatus 10. The image reading apparatus 10 includes a light emission controller 111, a driving controller 112, and an image information processing part 113. The light emission controller 111 controls the irradiation of light by the light source 102. The light emission controller 111 controls the turning on and off of the light source 102, in response to an operation by the user, for example. The driving controller 112 controls the operation of a driving part 108. The driving part 108 is for changing the orientation of the switching mirror 103, and drives the switching mirror 103 using a MEMS (Micro Electro Mechanical Systems) device or a piezoelectric actuator, for example. The driving part 108 and the switching mirror 103 working together realize a switching part of the present invention. The image information processing part 113 controls the operation of the light sensor 107. The image information processing part 113 recognizes the image information generated by the light sensor 107 as a code image, and computes and outputs coordinates after having analyzed the image information. Note that the destination of data output by the image information processing part 113 may be a communication part that communicates with an external device by a cable or wirelessly, or may, in the case where a memory such as a semiconductor memory is provided inside the image reading apparatus 10, be this memory.

Note that, hereinafter, the light emission controller 111, the driving controller 112 and the image information processing part 113 will also be collectively referred to as "controller 110". The controller 110 may be realized by a single arithmetic processing apparatus, or by multiple arithmetic processing apparatuses working together.

The configuration of the image reading apparatus 10 of the present exemplary embodiment is as described above. Based on this configuration, the image reading apparatus 10 of the present exemplary embodiment will be in a state of irradiating light while being held by the user and receiving detection of the reflected light thereof. The image reading apparatus 10, on reading the code image in this state, attempts to analyze the code image.

At this time, the controller 110 of the image reading apparatus 10 causes the reflected light to be measured at a predetermined frame rate (e.g., 60 fps (frames per second)) and generates image information, together with causing the switching mirror 103 to be driven at a speed compliant with the frame rate and switching the path of light irradiated from the light source 102. The controller 110 causes the reciprocation of the switching mirror 103 (movement from first position to second position and back to first position, or the reverse thereof) to be periodically performed 60 times (i.e., 30 reciprocations) when the frame rate is 60 fps, for example.

FIG. 4 is a timing chart showing a mode of reading image information. In FIG. 4, high level (Hi) denotes a state in which image information is measured, and low level (Lo) denotes a state in which image information is not measured. In the case where the image reading apparatus operates as in the present exemplary embodiment, image information resulting from light that has passed over the path $L_1$ and image information resulting from light that has passed over the path $L_2$ are measured alternately.

With the image reading apparatus 10, reflected light that includes a comparatively large specular component in addition to the diffuse component may be measured by the light sensor 107, in the case where the image reading apparatus 10 and the object Obj are in a specific positional relation. This positional relation is where the angle of incidence of incident light reflected by the reflecting mirror 104 (or 105) is the same or approximates the angle of reflection of light reflected toward the light sensor 107, in the case where the plane formed by the object Obj is the plane of incidence. Note that the distribution of the specular component in the reflected light differs according to the surface properties of the object Obj forming the plane of incidence. For example, depending on the image formed on the object Obj, the specular component may be substantially concentrated in a specific direction, or may be distributed to some degree around a specific direction. In the case where reflected light including a relatively large specular component is measured, the image information that the light sensor 107 generates may include an area in which the original image cannot be recognized due to the light intensity being saturated.

With the image reading apparatus 10 of the present exemplary embodiment, in the case where the light sensor 107 and one of the reflecting mirror 104 or 105 are in the above specific positional relation, the light sensor 107 and the other of the reflecting mirror 104 or 105 will not be in the specific positional relation. Therefore, at least one in two pieces of image information will be read by the light sensor 107 in a state where the specific positional relation is not satisfied, without a situation arising where image information is successively read in a state where the specific positional relation is satisfied. Accordingly, in the present exemplary embodiment, a situation where the original image cannot be recognized will not arise successively, even in the case where the image reading apparatus 10 is continuously held by the user in a state that satisfies the above specific positional relation.

2. Second Exemplary Embodiment

In a second exemplary embodiment of the present invention, a portion of the configuration of the image reading apparatus 10 of the first exemplary embodiment is changed. Therefore, in the present exemplary embodiment, the same reference numerals are given with regard to the configuration that is common with the image reading apparatus 10 of the first exemplary embodiment, and description thereof will be omitted.

FIG. 5 is a cross-sectional view showing the structure of a front end portion of an image reading apparatus of the present exemplary embodiment. The image reading apparatus 20 of the present exemplary embodiment includes a, light source 201 and a wedge-shaped mirror 202, in addition to a pointing member 101, reflecting mirrors 104 and 105 and a light sensor 107. The light source 201 has a light deflecting element 201d in the direction in which light is irradiated, and selectively switches the direction of travel of light to one of a path $L_3$ or a path $L_4$. The light deflecting element 201d changes the direction of travel of light according to an applied voltage. The wedge-shaped mirror 202 is a reflecting member having a first reflecting surface for reflecting light that will travel over the path $L_3$ and a second reflecting surface for reflecting light that will travel over the path $L_4$.

Figure 6:
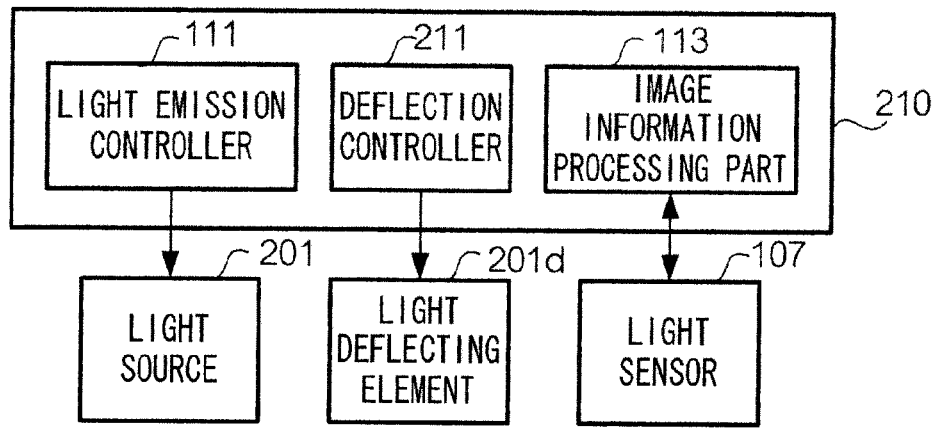
FIG. 6 is a block diagram showing a configuration of a control system of the image reading apparatus.

FIG. 6 is a block diagram showing a configuration of a control system of the image reading apparatus 20. The image reading apparatus 20 includes a light emission controller 111, a deflection controller 211, and an image information processing part 113. The deflection controller 211 controls the voltage applied to the light deflecting element 201d. The deflection controller 211 applies a first voltage to the light deflecting element 201d in the case of directing light toward the path $L_3$, and applies a second voltage to the light deflecting element 201d in the case of directing light toward the path $L_4$. Note that, hereinafter, the light emission controller 111, the deflection controller 211, and the image information processing part 113 will also be collectively referred to as "controller 210".

The configuration of the image reading apparatus 20 of the present exemplary embodiment is as described above. Based on this configuration, the image reading apparatus 20 of the present exemplary embodiment will be in a state of irradiating light while being held by the user, and being available for measurement of the reflected light thereof. The image reading apparatus 20 of the present exemplary embodiment differs from the image reading apparatus 10 of the first exemplary embodiment in that the mode of switching paths is different.

Figure 7:
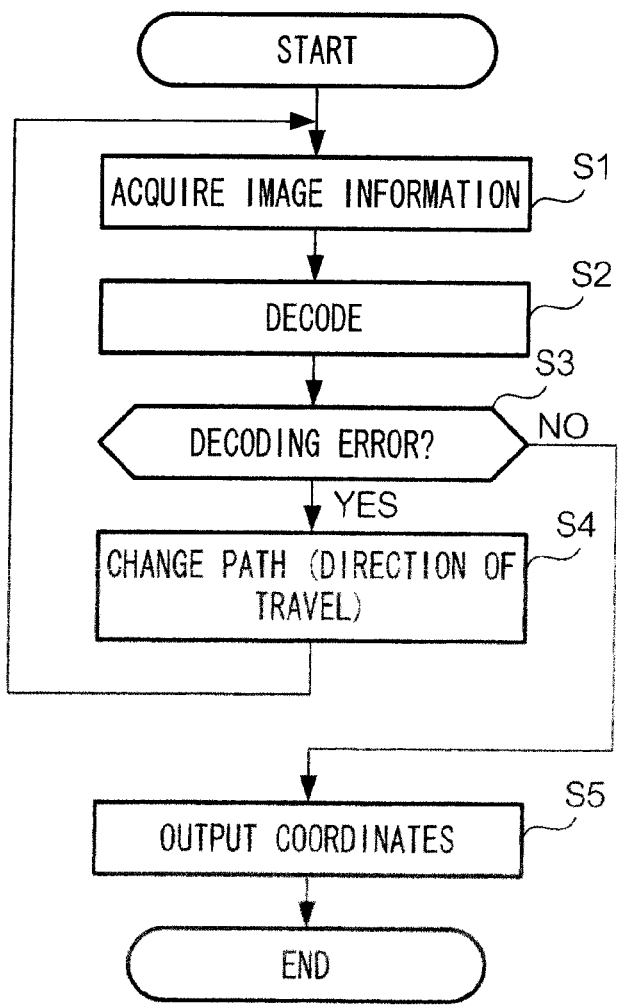
FIG. 7 is a flowchart showing a process that the image reading apparatus executes.

FIG. 7 is a flowchart showing a process that the controller 210 executes. As shown in FIG. 7, the controller 210, on acquiring image information (step S1), analyzes the image information and attempts to compute coordinates (step S2). The operation of step S2 will hereinafter be called "decoding". The controller 210 judges whether the decoding result is an error (step S3). In the case where it is judged that the decoding result is an error (step S3: YES), the controller 210 switches the voltage applied to the light deflecting element 201d and changes the path (step S4), before again acquiring image information (step S1). On the other hand, in the case where it is judged that the decoding result is not an error (step S3: NO), the controller 210 outputs the computed coordinates (step S5).

Note that a known method may be used in the judgment of whether the decoding result is an error. For example, the controller 210 may judge whether the decoding result is an error depending on whether a numerical value equating to coordinates could be computed, and, further, may judge that the decoding result is an error in the case where the difference with (distance from) the previously computed coordinates exceeds a predetermined threshold. This is because in the case where the distance from the previously computed coordinates is more than expected (e.g., in the case where the speed at which the user normally moves is exceeded), there is a strong possibility that the computed coordinates will not be correct.

Also with the image reading apparatus 20 of the present exemplary embodiment, in the case where the light sensor 107 and one of the reflecting mirror 104 or 105 are in the above specific positional relation, the light sensor 107 and the other of the reflecting mirror 104 or 105 will not be in the specific positional relation, similarly to the image reading apparatus 10 of the first exemplary embodiment. Accordingly, with the image reading apparatus 20 of the present exemplary embodiment, in the case where a decoding error is caused by specular reflection, switching the path after the error reduces the possibility of an error caused by specular reflection occurring after the switching.

Also, on comparing the operation of the present exemplary embodiment and the operation of the first exemplary embodiment, the path is switched less frequently with the operation of the present exemplary embodiment compared with the operation of the first exemplary embodiment.

Note that in the present exemplary embodiment, the path may be switched in the case where errors occur continuously a set number of times, a rather than switching the path every time an error occurs. This allows the frequency with which the path is switched to be reduced in comparison to the case where the path is switched every time an error occurs.

3. Variations

The abovementioned exemplary embodiments are examples of the present invention. With the present invention, the following variations can be applied, for example. Note that the abovementioned exemplary embodiments and the following variations may be applied in combination as necessary. For example, the present invention may be configured such that the operation of the second exemplary embodiment (see FIG. 7) is performed with the configuration of the first exemplary embodiment (see FIGS. 2A, 2B).

3-1. Variation 1

Figure 8:
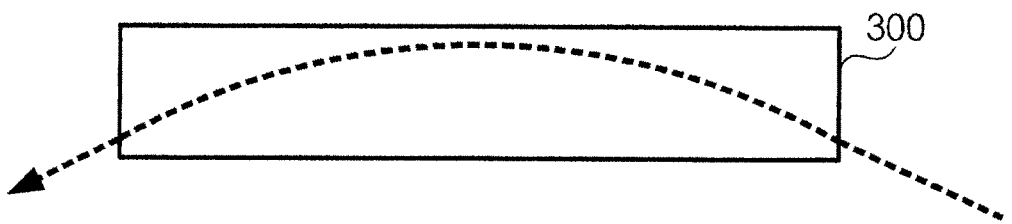
FIG. 8 shows an exemplary light guiding part of the present invention.

FIG. 8 shows an exemplary light guiding part of the present invention. The light guiding part 300 shown in FIG. 8 is a member that transmits light, and has a refractive index distribution therewithin. Light traveling inside the light guiding part 300 exits after the direction of travel thereof has been bent, as shown in FIG. 8. This light guiding part 300 is a possible alternative to the abovementioned reflecting mirrors 104 and 105.

3-2. Variation 2

The present invention may, in the case where the direction of travel of light is switched periodically, that is, independently of the light measurement result such as in the first exemplary embodiment, be configured so that processing such as decoding is performed by an external device. In this case, the image reading apparatus need only output image information generated based on reflected light to the external device.

3-3. Variation 3

In the present invention, light irradiated by the light source may travel in three or more directions.

Figure 9:
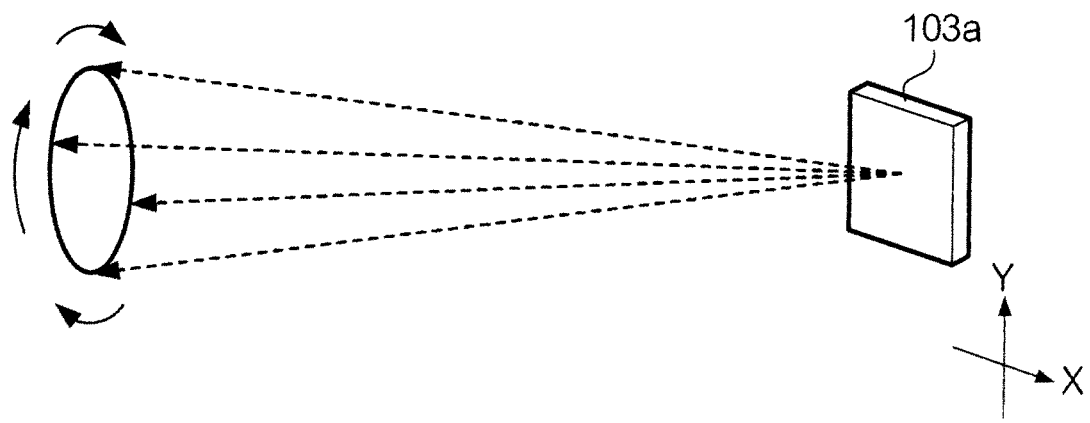
FIG. 9 shows a variation of a switching mirror (reflecting part).

FIG. 9 shows a variation of the switching mirror 103 of the first exemplary embodiment. A switching mirror 103a according to the present variation is a mirror whose directions of motion have been increased over the switching mirror 103 of the first exemplary embodiment, to also reciprocate in the Y-axis direction of FIG. 9 in addition to the X-axis direction. In the case of this configuration, there are four directions of travel of light. Note that in this case, the number of reflecting parts may be provided according to the directions of travel of light, or a cylindrical reflecting mirror with a mirror surface on the inside may be provided.

Also, with the configuration shown in FIG. 9, the directions of motion of the switching mirror 103a may be further increased, such that there are eight or 16 directions of travel of light. In this case, the movement of the switching mirror 103a is desirably such that the paths of light are selected in a circular pattern.

3-4. Variation 4

The light source of the present invention is not limited to a light source that irradiates light in a single predetermined direction (as in the first exemplary embodiment). Accordingly the light source of the present invention may be configured such that there are multiple directions of travel of light by changing the direction in which light is irradiated. For example the present invention may include a switching part that switches the direction of travel of light by inclining the light source itself.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An image reading apparatus comprising:
   a casing having an opening at a front end of the casing, the front end of the casing opposite a rear end of the casing;
   a light source that irradiates light towards the rear end of the casing;
   a plurality of light guiding units that guide the light towards the front end of the casing through the opening to a same position on an object along different directions from each other;
   a switching unit that switches a direction of the light irradiated by the light source such that the light travels along a path leading to any one of the plurality of light guiding units;
   a light sensor that measures reflected light that is reflected by a point of the object disposed at the position through the opening out of the light guided to the position by the plurality of light guiding units, wherein the sensor receives the reflected light directly from the object,
   wherein the plurality of light guiding units comprises a first light guiding unit in a first positional relationship to the light sensor such than an angle of incidence of light guided by the first light guiding unit is different from an angle of reflection of the reflected light that is reflected toward the light sensor, in a case a surface of the object is a plane of incidence, and a second light guiding unit in a second positional relationship to the light sensor different from the first positional relationship,
   wherein the first light guiding unit comprises a first mirror and the second light guiding unit comprises a second mirror.

2. The image reading apparatus according to claim 1, wherein the switching unit includes:
   a reflecting unit that reflects towards the front end of the casing the light irradiated by the light source towards the rear end of the casing; and
   a driving unit that drives the reflecting unit to switch a direction of reflection of light such that the light travels along the path leading to any one of the plurality of light guiding units.

3. The image reading apparatus according to claim 2, wherein the switching unit sequentially switches the direction of travel at a predetermined cycle.

4. The image reading apparatus according to claim 3, further comprising a pointing member for pointing a position to be targeted as the point of the object disposed at the position.

5. The image reading apparatus according to claim 2, wherein the switching unit determines a timing of the switching based on the reflected light measured by the light sensor.

6. The image reading apparatus according to claim 5, further comprising a pointing member for pointing a position to be targeted as the point of the object disposed at the position.

7. The image reading apparatus according to claim 2, further comprising a pointing member for pointing a position to be targeted as the point of the object disposed at the position.

8. The image reading apparatus according to claim 1, further comprising:
   a light deflecting element that changes the direction of travel of light irradiated by the light source, according to an applied voltage,
   wherein the switching unit switches the direction of travel by controlling the voltage applied to the light deflecting element.

9. The image reading apparatus according to claim 8, wherein the switching unit sequentially switches the direction of travel at a predetermined cycle.

10. The image reading apparatus according to claim 9, further comprising a pointing member for pointing a position to be targeted as the point of the object disposed at the position.

11. The image reading apparatus according to claim 8, wherein the switching unit determines a timing of the switching based on the reflected light measured by the light sensor.

12. The image reading apparatus according to claim 11, further comprising a pointing member for pointing a position to be targeted as the point of the object disposed at the position.

13. The image reading apparatus according to claim 8, further comprising a pointing member for pointing a position to be targeted as the point of the object disposed at the position.

14. The image reading apparatus according to claim 1, wherein the switching unit sequentially switches the direction of travel at a predetermined cycle.

15. The image reading apparatus according to claim 14, further comprising a pointing member for pointing a position to be targeted as the point of the object disposed at the position.

16. The image reading apparatus according to claim 1, wherein the switching unit determines a timing of the switching based on the reflected light measured by the light sensor.

17. The image reading apparatus according to claim 16, further comprising a pointing member for pointing a position to be targeted as the point of the object disposed at the position.

18. The image reading apparatus according to claim 1, further comprising a pointing member for pointing a position to be targeted as the point of the object disposed at the position.

19. The image reading apparatus according to claim 1, wherein the sensor receives the reflected light directly from the object without reflection of the reflected light by a light guiding unit in the casing.

* * * * *